March 20, 1962     E. G. GALLIERS     3,026,498

SAFE TRAILING DISTANCE WARNING SYSTEMS FOR VEHICLES

Filed May 19, 1960

INVENTOR.
EDWARD G. GALLIERS
BY Norbert P. Holler
ATTORNEY 3,026,498
SAFE TRAILING DISTANCE WARNING
SYSTEMS FOR VEHICLES
Edward G. Galliers, 3050 Gerrittsen Ave.,
Brooklyn 29, N.Y.
Filed May 19, 1960, Ser. No. 30,167
2 Claims. (Cl. 340—104)

This invention relates to safety signals for cars, trucks, buses and other vehicles, and in particular to a safe trailing distance warning system for such vehicles.

Rear end collisions between a leading and a trailing vehicle annually result in greater losses of life and property than perhaps all other types of traffic accidents. As is well known, many automobile drivers when trailing another vehicle have a tendency, due perhaps to carelessness, a failure to understand the influence of momentum in the matter of stopping a car, an absolute disregard of the safety of others, or some other reason, to approach too close to the rear of the leading vehicle. As a result, when the driver of the leading vehicle, in an emergency, must stop his vehicle suddenly, the trailing driver cannot apply his brakes in time to stop also and thus slams into the rear of the leading vehicle. This problem is particularly acute during night time, when the vision of most human beings is generally not as good as during the day and when drivers are generally more tired than at other times. As far as driving is concerned, this means that a trailing driver's judgment of the distance between his and the leading vehicle is usually impaired to a certain extent at night, while at the same time his reflexes may be somewhat dulled due to fatigue, with the result that it takes him possibly as much as one or several seconds longer to remove his foot from the accelerator pedal and transfer it to the brake pedal than it would during the day or if he were not tired. At high speeds especially, but also at medium speeds, this delay may be and frequently is fatal.

Attempts have been made in the past to solve this problem. The provision of rear end lights on vehicles which go on when the brake pedal of such a vehicle is depressed constitutes one of the greatest advances in driver safety of the past generation. Moreover, tail and brake lights have been made bigger and bigger over the years to render them more noticeable to trailing drivers. Nevertheless, rear end collisions continue to plague the driving public and to exact a frightful toll in human life, due to the fact that the trailing driver is not warned of being too close to the leading car until it is too late.

It is, therefore, an important object of the present invention to provide a safety signal system for automobiles and like vehicles which will serve to warn a trailing driver that he is getting too close to a leading vehicle before an emergency arises.

It is another important object of the present invention to provide a safety signal system of the aforesaid type which is arranged in its entirety on the leading vehicle but is not under the control of the driver of the leading vehicle and can be actuated only by light incident on the leading vehicle from behind the latter.

A further object of the present invention is the provision of means for varying the sensitivity of such a safety signal system in direct relation to the speed of the leading vehicle, to ensure thereby that at higher speeds the trailing driver is warned of being too close at a greater distance from the leading vehicle than at lower speeds.

It is also an object of the present invention to provide a safe trailing distance warning system which is inexpensive to produce and can be installed at little cost as standard equipment on all types of vehicles, such as cars, trucks, buses, trains, fire engines or other emergency vehicles, etc.

Broadly, the warning system according to the present invention comprises a photosensitive device mounted at the rear of a vehicle, preferably at a low location, and adapted to receive light from behind the said vehicle, e.g. from the headlights of a trailing vehicle. The photosensitive device, which is preferably of a varying resistance type, is connected into a circuit which includes a transistor amplifier, a sensitivity-regulating rheostat, a lamp or like signal device, and the headlight "on-off" switch of the first-named vehicle. The signal device is also mounted at the rear of the same vehicle, preferably high up, to ensure that it cannot fail to be noticed by the driver of the trailing vehicle.

The foregoing and other objects, characteristics and advantages of the present invention will be more fully understood from the following detailed description thereof when read in conjunction with the accompanying drawing, in which.

Figure 2:
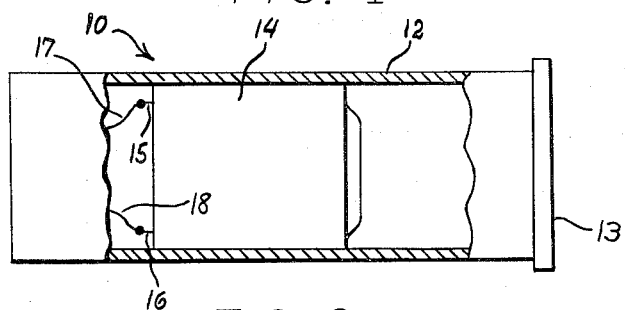
FIG. 2 is a side elevational view, partly broken away to show interior details, of a photosensitive device employed in the said system.

Referring now more particularly to the drawing, it will be seen that the warning system according to the present invention comprises a photosensitive device 10 which includes an operative element 11 the resistance of which changes with incident illumination. As shown in FIG. 2, the device 10 comprises a generally hollow tubular housing 12 which is open at the flanged front end 13 thereof. Positioned substantially centrally of the housing 12 is a photocell 14 in which the element 11 is incorporated. This photocell is preferably of a commercially available type manufactured by Radio Corporation of America under the designation RCA–6957, and thus its construction, which per se constitutes no part of the present invention, is not more explicitly described herein or illustrated in the drawing. The photocell is provided with a pair of terminals 15 and 16 to which are connected leads 17 and 18, respectively.

Figure 1:
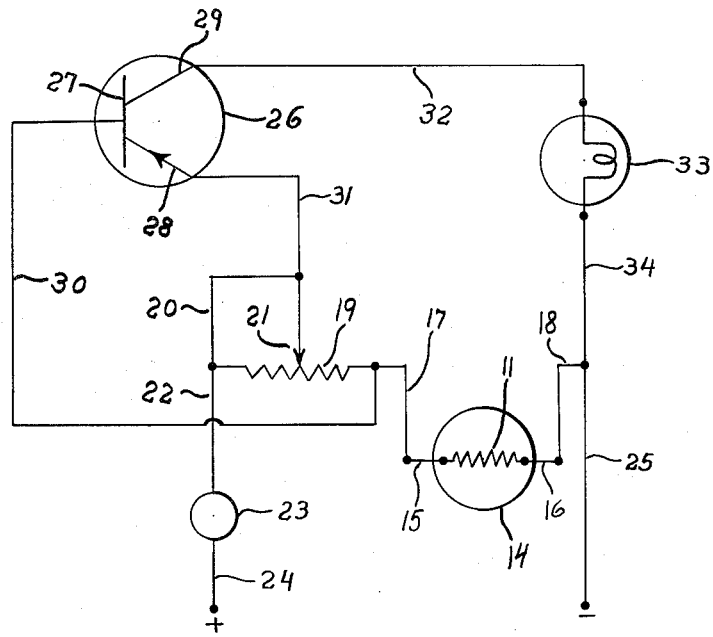
FIG. 1 is a circuit diagram of the safe trailing distance warning system according to the present invention.

As clearly shown in FIG. 1, the photocell element 11 is connected via the lead 17 to one end terminal of a rheostat 19, the other end terminal of which is connected by a lead 20 to the movable tap 21 of the rheostat and by a lead 22 to the light switch 23 found on the instrument panel of the vehicle. The switch is connected by a lead 24 to the positive terminal of the battery of the vehicle, and the lead 18 by a lead 25 to the negative terminal of the battery. It will be readily appreciated, therefore, that the photosensitive element 11 and the rheostat 19 are connected across the battery and together constitute a voltage divider, for a purpose which will become clearer presently. Merely by way of example, the resistance of the rheostat is about 1,000 ohms.

In accordance with the present invention, use is made of a transistor amplifier 26 which comprises a base 27, an emitter 28 and a collector 29. The transistor 26 is of the PNP type and is available commercially under the designation CBS–2N256, but it will be understood that a transistor of the NPN type can be employed as well in lieu of the illustrated transistor. The base 27 of the transistor amplifier is connected by a lead 30 to the junction between the lead 17 and the rheostat 19, while the emitter 28 is connected by a lead 31 to the movable tap 21 of the rheostat 19 and thus via leads 20, 22 and 24 and switch 23 to the positive terminal of the vehicle battery. The collector 29 of the transistor amplifier 26 is connected by a lead 32 to a bulb or similar light-emitting device 33 which in turn is connected by a lead 34 to the lead 25 and thus to both the negative battery terminal and the photosensitive resistor element 11.

Figure 3:
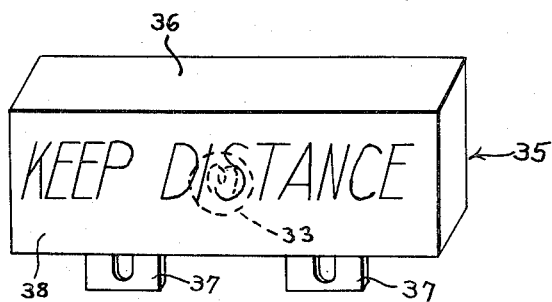
FIG. 3 is a somewhat schematic illustration, in perspective, of one type of warning indicator or signal device which can be employed as a part of the warning system.

The bulb 33 constitutes a part of a warning signal device or indicator 35 shown schematically in FIG. 3. The signal device 35 in essence comprises a housing 36 provided at its rear with a pair of apertured lugs or brackets 37 by means of which it may be mounted at the rear of the vehicle. It will be clear, of course, that the actual presence or construction of the brackets 37 will depend on the location at which the device is to be mounted. The front face of the signal device 35 is a glass plate 38 behind which the bulb 33 is located and on which, in the illustrated embodiment of the invention, are arranged in any suitable manner the words "Keep Distance" or a like message. These words may be printed on the glass plate or applied thereto by decalcomania, and preferably the letters are colored in such a way as to provide a good contrast between them and the color of the vehicle. If desired, the glass plate 38 itself may also be colored differently from the letters, to thereby enhance the contrast and visibility of the warning message.

In carrying the invention into practice, the photosensitive device 10 is mounted at the rear of the vehicle at a level below the trunk or other main part of the vehicle body, preferably within one of the rear fenders or just above the rear bumper and about 22" from the ground. The cell 14 is, therefore, in a position to pick up any light emitted by the headlights of a trailing vehicle, even when these headlights are on "low beam," at distances of 40 feet or more, depending on the alignment of the headlights, while with the latter on "high beam" the cell will pick up the light at distances of 200 feet or more. The signal device 35, on the other hand, is mounted much higher than the photosensitive device, preferably at a level as high as the ordinary automobile trunk. For example, with brackets 37 as shown in FIG. 3, the signal device may be easily mounted at the top edge of the license plate or at the top edge of the license plate holder. Alternatively, of course, the signal device may be located within the vehicle immediately adjacent the rear window thereof. In any event, the bulb 33 can be easily connected into the electrical system of the vehicle.

It will be apparent that when the signal device is disposed at a level as high as described, it will be located within the normal line of sight of the trailing driver. As soon as the bulb is lit, consequently, the signal will force itself on the trailing driver's attention, thus enabling him to decelerate his vehicle to a degree reestablishing a safe driving distance between the two vehicles.

As described, the system is usually rendered inoperative during daylight hours, due to the fact that the light switch 23 is then in the "off" position. In the evening or at night, however, when the lights are turned on, the circuit shown in FIG. 1 is rendered responsive to incident illumination. The normal resistance of the element 11 in the absence of outside illumination is such that the voltage divider 19—11 can be set to keep the bulb 33 dark by putting on the transistor 26 a bias voltage insufficient to render the transistor conducting. As soon as the cell 14 picks up any light emanating from the headlights of a trailing vehicle, the resistance of element 11 decreases, whereby the current flowing through the voltage divider increases and thus also the bias voltage on the transistor 26. The latter is now conducting, and a current flows through the bulb 33 to light the same and illuminate the glass plate 38. The trailing driver can, therefore, read the message and either reduce the pressure of his foot on his accelerator pedal or apply his brake to an extent sufficient to reduce his vehicle's speed until the desired safe driving distance between the leading and trailing vehicles is reestablished, as evidenced by the extinction of the bulb 33.

In lieu of or in addition to having a warning message provided on the signal device 35, it is possible in accordance with the present invention to modify the circuit slightly so as to cause the bulb 33 to emit light intermittently. This may be accomplished by the provision of any suitable flasher (not shown), for example such as is used in the standard direction or turn signal devices on practically all present day cars and trucks. The use of a flashing signal is even less liable to be ignored or remain unnoticed by the trailing driver than the steady signal described hereinbefore.

As will be appreciated, the presence of the rheostat 19 enables the sensitivity of the system to be varied, in view of the fact that the initial bias voltage applied to the transistor amplifier 26 can be set so as to require a greater or lesser intensity of outside illumination incident on the photocell 14 to render the transistor conducting. It is, accordingly, possible within the confines of the present invention to render the sensitivity of the system responsive to the speed of the vehicle on which it is arranged. This may be accomplished, for example, by connecting the wiper or movable tap 21 of the rheostat 19 to a tachometer or like speed-responsive device (not shown) operatively connected to the engine shaft of the vehicle. Alternatively, the voltage divider part of the circuit shown in FIG. 1 may be connected with a device (not shown) which uses the pulses coming from the distributor of the vehicle to produce a variable voltage proportional to the speed of the vehicle, which variable voltage would then be applied to the voltage divider. The higher the speed, therefore, the more positive the transistor bias and the sooner it is rendered conducting. Thus, since in such a case the trailing vehicle must also be traveling at least at the same high speed as the leading vehicle, its driver will be warned of approaching too close while at a greater distance from the leading vehicle than would occur at lower speeds.

It is to be understood that the foregoing description of preferred embodiments of the present invention is for purposes of illustration only, and that a number of changes and modifications can be made in the structure and structural arrangements disclosed without any departure from the spirit and scope of the invention as defined in the appended claims.

Having thus particularly described my invention, what I claim and desire to secure by Letters Patent is:

1. A safe trailing distance warning system for indicating to the driver of a trailing vehicle that he is approaching too close to the rear of a leading vehicle, comprising a source of electric power carried by said leading vehicle, a transistor amplifier having a base, an emitter and a collector, a voltage divider connected across said source of electric power, said voltage divider comprising a photosensitive resistor the resistance of which varies inversely with the intensity of incident illumination and a rheostat connected in series with said photosensitive resistor, said photosensitive resistor being mounted at the rear of said leading vehicle in a position to have light from the headlights of said trailing vehicle fall thereon, and a light-emitting signal device mounted at the rear of said leading vehicle in a position to be visible to the driver of said trailing vehicle, said signal device and said power source being connected in series with one another between said emitter and said collector of said transistor amplifier, and said base of said transistor amplifier being connected to said voltage divider at the junction of said photosensitive resistor with said rheostat, the operative resistance value of said rheostat photosensitive resistor, the bias voltage applied through said voltage divider to said transistor amplifier is insufficient to render the latter conducting unless light from said trailing vehicle is incident on said photosensitive resistor at less than a predetermined distance between said vehicles.

2. A warning system according to claim 1, further comprising means connected to said voltage divider for varying the normal output voltage thereof, and thus the initial bias voltage on said transistor amplifier and the sensitivity of the latter, as a function of the speed of said leading vehicle, whereby at relatively higher or lower speeds said signal device may be energized at correspondingly greater or smaller distances between said leading and trailing vehicles.

References Cited in the file of this patent

UNITED STATES PATENTS

| | | |
|---|---|---|
| 1,612,427 | Flursheim | Dec. 28, 1926 |
| 2,034,616 | Gossler | Mar. 17, 1936 |
| 2,605,393 | Holm | July 29, 1952 |
| 2,771,594 | Gourdou | Nov. 20, 1956 |
| 2,851,673 | Hollins | Sept. 9, 1958 |
| 2,896,089 | Wesch | July 21, 1959 |
| 2,939,108 | McIntire | May 31, 1960 |
| 2,974,304 | Nordlund | Mar. 7, 1961 |

FOREIGN PATENTS

| | | |
|---|---|---|
| 711,873 | Great Britain | July 14, 1954 |

UNITED STATES PATENT OFFICE
CERTIFICATE OF CORRECTION

Patent No. 3,026,498

March 20, 1962

Edward G. Galliers

It is hereby certified that error appears in the above numbered patent requiring correction and that the said Letters Patent should read as corrected below.

In the heading to the printed specification, lines 4 and 5, post-office address of inventor, for "3050 Gerrittsen Ave., Brooklyn 29, N. Y." read -- 119 Dictum Court, Brooklyn 29, N. Y. --; column 4, line 66, for "photosensitive resistor," read -- being set so that --.

Signed and sealed this 3rd day of July 1962.

(SEAL)
Attest:

ERNEST W. SWIDER
Attesting Officer

DAVID L. LADD
Commissioner of Patents